United States Patent [19]
Spear et al.

[11] Patent Number: 5,460,488
[45] Date of Patent: Oct. 24, 1995

[54] SHROUDED FAN BLADE FOR A TURBINE ENGINE

[75] Inventors: David A. Spear, Manchester; Bruce P. Biederman, Meriden, both of Conn.

[73] Assignee: United Technologies Corporation, Hartford, Conn.

[21] Appl. No.: 259,705

[22] Filed: Jun. 14, 1994

[51] Int. Cl.$^6$ .................................................. F01D 5/22
[52] U.S. Cl. ........................................ 416/193 R; 416/191
[58] Field of Search .............................. 416/191, 193 R, 416/196 R

[56] References Cited

U.S. PATENT DOCUMENTS

| | | | |
|---|---|---|---|
| 2,912,157 | 11/1959 | Taylor | 230/134 |
| 3,193,185 | 7/1965 | Erwin et al. | 416/193 |
| 3,216,699 | 11/1965 | Schoenborn | 253/77 |
| 3,396,905 | 8/1968 | Johnson | 230/122 |
| 3,477,795 | 11/1969 | Beesley | 416/191 |
| 3,524,712 | 8/1970 | Petrie et al. | 416/191 |
| 3,837,761 | 9/1974 | Brown | 416/191 |
| 4,326,836 | 12/1979 | Fitton | 416/196 |
| 4,734,010 | 3/1988 | Battig | 416/196 |
| 4,798,519 | 1/1989 | Zipps | 416/191 |
| 5,257,908 | 11/1993 | Ortolano | 416/190 |

FOREIGN PATENT DOCUMENTS

| | | | |
|---|---|---|---|
| 0092303 | 7/1981 | Japan | 416/196 |
| 0072100 | 5/1947 | Norway | 416/193 |
| 0985327 | 12/1982 | U.S.S.R. | 416/191 |

*Primary Examiner*—Edward K. Look
*Assistant Examiner*—Mark Sgantzos
*Attorney, Agent, or Firm*—Kenneth C. Baran

[57] ABSTRACT

A compressor or fan blade (112) for a gas turbine engine includes a suction surface midspan shroud (122) which is cambered so that the shroud trailing edge (132) is substantially aligned with the direction of the air flow in the vicinity of the shroud trailing edge (132). The cambered portion originates at the chordwise location where a shock wave (60) attached to the leading edge of the neighboring blade crosses the shroud (136). The cambered portion gradually transitions to an uncambered profile at a circumferential location intermediate the suction surface (110) of the blade (112) and the pressure surface shroud of the neighboring blade.

10 Claims, 4 Drawing Sheets

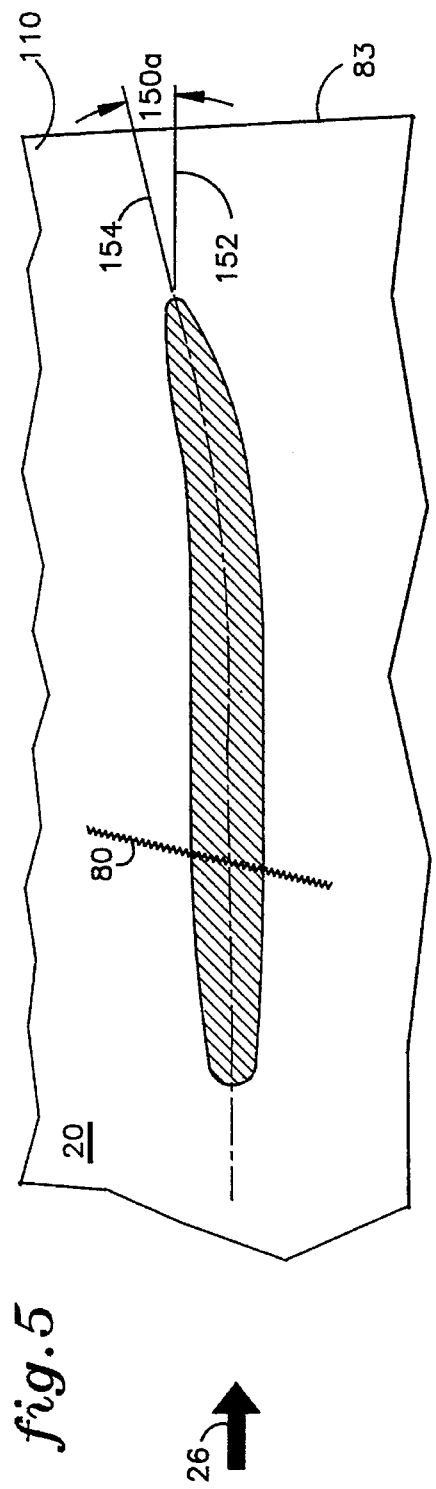
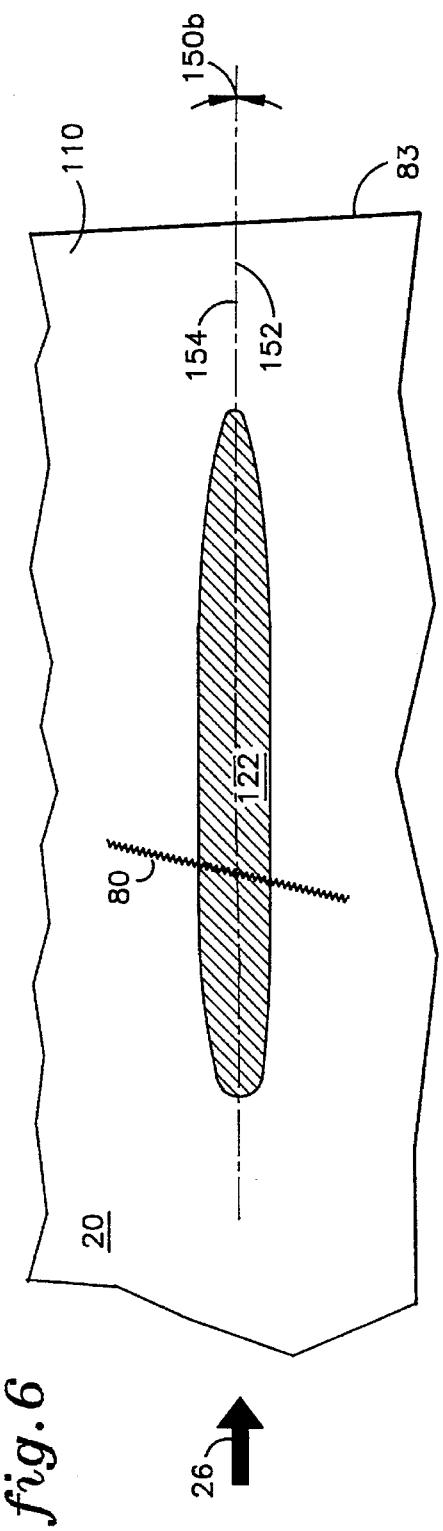

5,460,488

SHROUDED FAN BLADE FOR A TURBINE ENGINE

TECHNICAL FIELD

This invention relates to fan and compressor blades for turbine engines and more particularly to blades having a suction surface midspan shroud which is cambered toward the blade tip to reduce airflow separation near the shroud trailing edge thereby minimizing aerodynamic drag and improving blade efficiency.

BACKGROUND OF THE INVENTION

Axial flow gas turbine engines employ longitudinally alternating arrays of rotating blades and nonrotating vanes in their compressor and fan sections. The blades and vanes cooperate to compress a stream of air flowing essentially longitudinally through the engine. It is not uncommon for the rotating blades, and particularly the fan blades, to each be formed with an integral shroud set. Each shroud set is a pair of circumferentially extending shrouds, one projecting from the suction surface and one projecting from the pressure surface of each blade. Because the shrouds are located intermediate the blade root and the blade tip, they are often referred to as midspan shrouds, although they can be located anywhere along the blade span, not just at the midpoint of the span. When all of the blades are assembled in an engine, the suction surface shroud of each blade abuts the pressure surface shroud of the neighboring blade so that the shrouds describe a ring. During engine operation, the shroud ring resists vibration and twisting of the blades.

During engine operation, boundary layers form on the engine surfaces, including the blades and shrouds. A boundary layer is a region or layer of impeded airflow adjacent the surface of any object over which the air moves. Air flowing in a boundary layer is dominated by the effects of fluid viscosity and flows with a lower velocity than the air outside the boundary layer, a region known as the free stream. Within the boundary layer, the air velocity is nonuniform, varying from zero at the surface to the free stream velocity at the outer edge of the boundary layer. The distance, perpendicular to the surface, over which the velocity varies from zero to the free stream velocity defines the boundary layer thickness.

At some operating conditions, the leading edge of each blade produces a planar shock wave that extends across the flow passages between the blades and crosses the suction surface shroud of the neighboring blade in the blade array. The properties of the engine air stream change abruptly as the air stream passes through the shock wave; for example, the free stream velocity decreases and the pressure increases. When the free stream airflow is decelerated by the shock wave, it loses momentum and a portion of the free stream air close to the slower moving boundary layer joins the boundary layer and becomes a part thereof. Consequently, while the blade and shroud boundary layers upstream of the shock wave are very thin, typically only a few thousandths of a centimeter, the boundary layers downstream of the shock wave can be quite thick. The thickening of the boundary layer is especially significant at the junctures between each blade and its suction surface shroud where the individual blade and shroud boundary layers combine into disproportionately thick, merged boundary layers. The merged boundary layer thickness, measured perpendicular to either a shroud surface or a blade surface, is as much as 15% of the distance between neighboring blades, resulting in a considerable volume of impeded airflow.

The air in the blade and shroud boundary layers not only flows with impeded forward velocity, but is also centrifuged radially outward due to the rotation of the blades about the engine's longitudinal central axis. Consequently, when the air which flows in the boundary layer attached to the radially inner face of each shroud proceeds beyond the shroud trailing edge, it spills radially outward around the shroud trailing edge. The spilled air collides with and further impedes the slowly flowing, radially centrifuged air in the boundary layer attached to the shroud's radially outer face. The spillage is not usually harmful to the air flowing over the outer face of a pressure surface shroud. However the spillage encourages the air flowing in the merged boundary layer attached to the outer face of each suction surface shroud to separate from both the shroud outer face and from the adjoining blade surface. The airflow separation creates a region of high turbulence with attendant aerodynamic drag and degraded blade and shroud efficiency. A small region of such turbulence may be tolerable. However the disproportionate thickness of the merged boundary layer gives rise to a turbulent region of considerable volume and consequently, considerable drag.

The above described behavior might be mitigated by suction surface shrouds whose trailing edges project downstream of the blade trailing edges. In this case there is no juncture between the shroud and blade downstream of the blade trailing edge. The merged boundary layer, therefore, cannot extend to the trailing edge of the shroud, and hence cannot contribute to the volume of impeded, radially centrifuged flow near the shroud trailing edge. As a result, little or no separated, turbulent flow is created on the shroud outer face by the spillage from the inner face. However the extension of the shroud places unacceptable stresses on the thin trailing edge of the blade, and therefore is structurally untenable.

Therefore, it is seen that midspan shrouds of conventional construction, while beneficial for preventing blade vibration and twisting, diminish the operating efficiency of an engine. Accordingly, a shroud that provides its beneficial effects while minimizing aerodynamic drag and inefficiency is sought.

DISCLOSURE OF THE INVENTION

According to the present invention the suction surface midspan shroud for each blade in an array of fan or compressor blades is cambered or curved so that the shroud trailing edge is substantially aligned with the direction of the airflow downstream of the merged boundary layers at the junctures of the blade and the shroud. This flow direction is the direction resulting from the combination of impeded forward velocity in the boundary layer and radial centrifuging of the boundary layer airflow. In one embodiment, the cambered portion of the shroud originates at the chordwise location where a shock wave created by the leading edge of the neighboring blade crosses the shroud. In one detailed embodiment, the cambered portion of each shroud extends from approximately the midchord of the shroud to its trailing edge.

The cambered portion of the shroud gradually transitions to an uncambered profile at a circumferential location intermediate the suction surface of the blade and the pressure surface of the adjacent blade. In one embodiment the transition to an uncambered profile is complete at approximately twenty percent of the arc length between corresponding locations on adjacent blades.

It is an object of this invention to overcome the aerodynamic inefficiencies inherent in conventionally shrouded fan and compressor blades by providing a cambered midspan shroud having reduced aerodynamic drag.

An advantage of the present invention is the avoidance of aerodynamic drag associated with airflow separation from the outer face of the shroud and from the adjoining blade surface.

The foregoing advantage and the features and operation of the invention will become more apparent in light of the following description of the best mode for carrying out the invention and the accompanying drawings.

BRIEF DESCRIPTION OF THE DRAWINGS

FIG. 5 is a side elevation of the suction surface of the fan blade of FIG. 4 showing, in cross section, the contour of the suction surface shroud, the cross section being taken at approximately 10% pitch.

FIG. 6 is a side elevation of the suction surface of the fan blade of FIG. 4 showing, in cross section, the contour of the suction surface shroud, the cross section being taken at approximately 20% pitch.

BEST MODE FOR CARRYING OUT THE INVENTION

Figure 1:
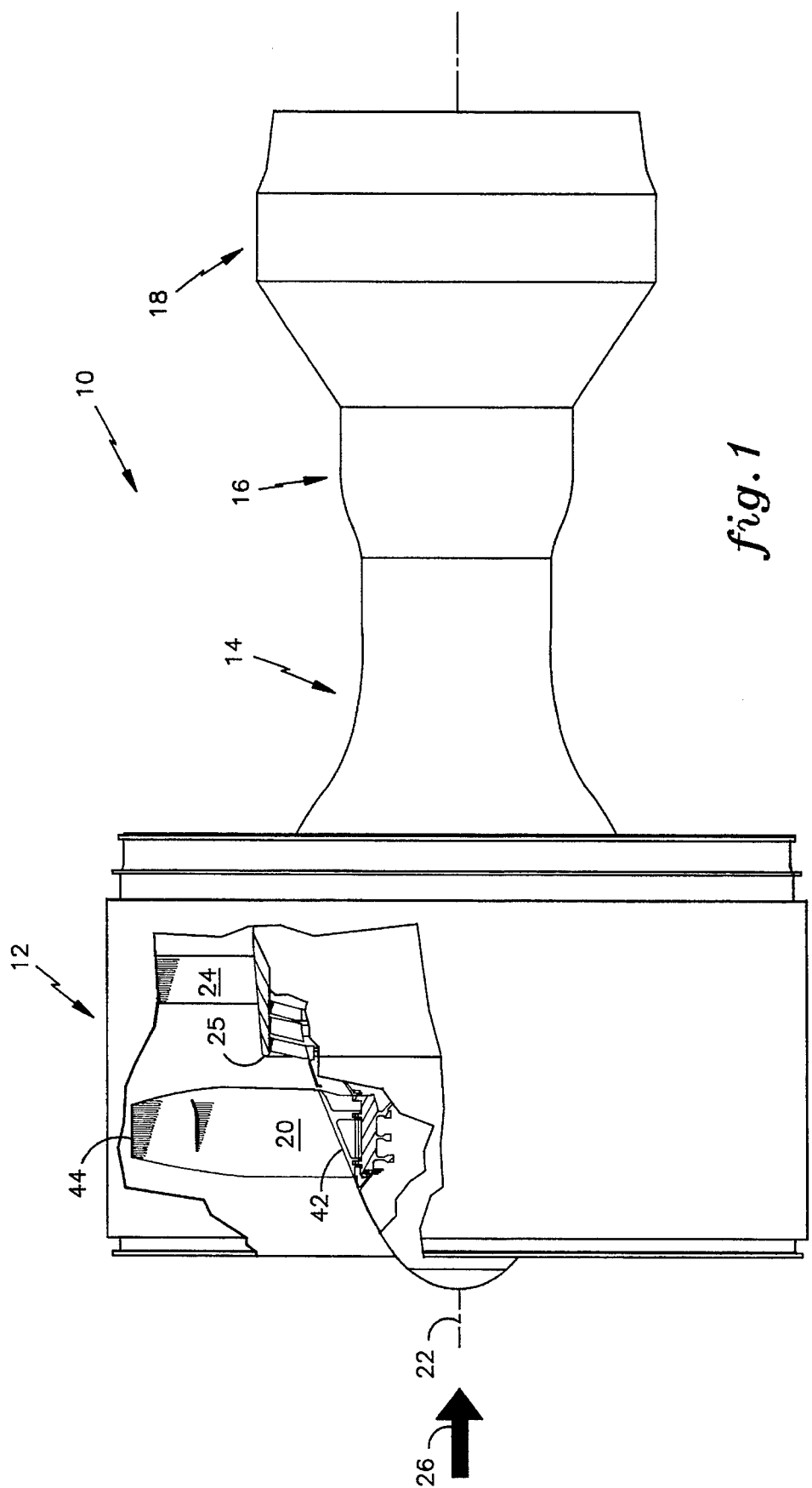
FIG. 1 is a schematic side elevation of a turbofan gas turbine engine with portions of the fan casing broken away to reveal the fan blades and vanes.

Referring to FIG. 1, an axial flow gas turbine engine 10 includes as its principal components a fan section 12, a compression section 14 with one or more compressors, a combustion section 16 and a turbine section 18 with one or more turbines. The fan and compressors have longitudinally alternating rows or arrays of radially extending blades, such as the fan blade 20 which are rotatable about a longitudinal central axis 22, and nonrotating vanes 24. A flow splitter 25 separates the incoming air stream 26 into an inner stream and an outer stream. The inner stream flows through the compression section and is compressed by the compressor vanes and blades. The inner stream then flows through the combustion section where it supports combustion of a fuel. The resulting hot, high pressure combustion products expand through vane and blade arrays in the turbines to power the fan and compressors. Finally, the inner flow stream passes through a main engine exhaust nozzle, not shown, where it expands and produces thrust for powering an aircraft. The outer air stream is compressed by the fan blades 20 and vanes 24 and then expands through a fan exhaust nozzle, not shown, to produce additional thrust.

Figure 2:
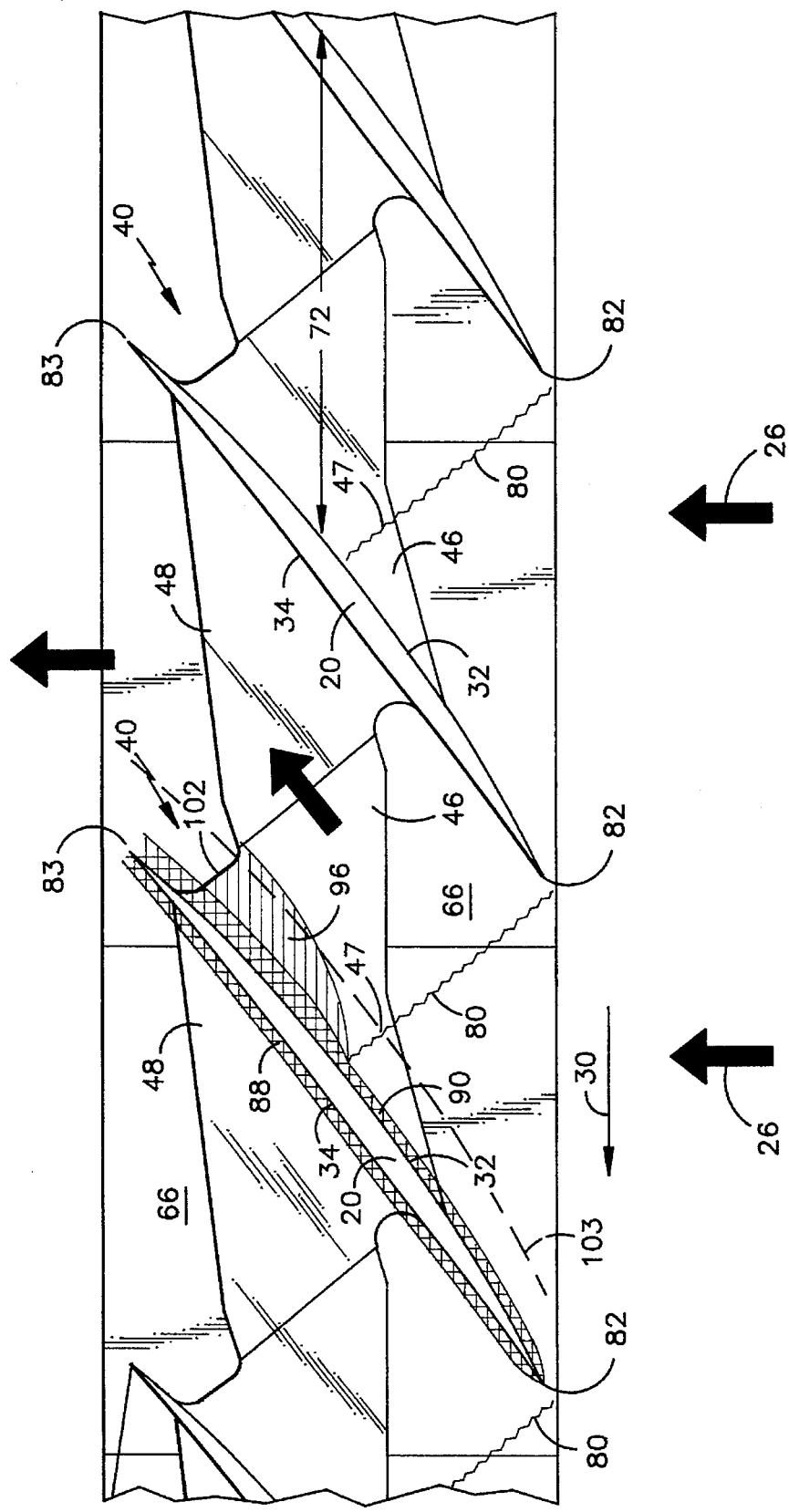
FIG. 2 is a plan view (looking radially inward) of two fan blades of the engine of FIG. 1, illustrating typical features, airflow patterns and aerodynamic phenomena associated with such blades.
Figure 3:
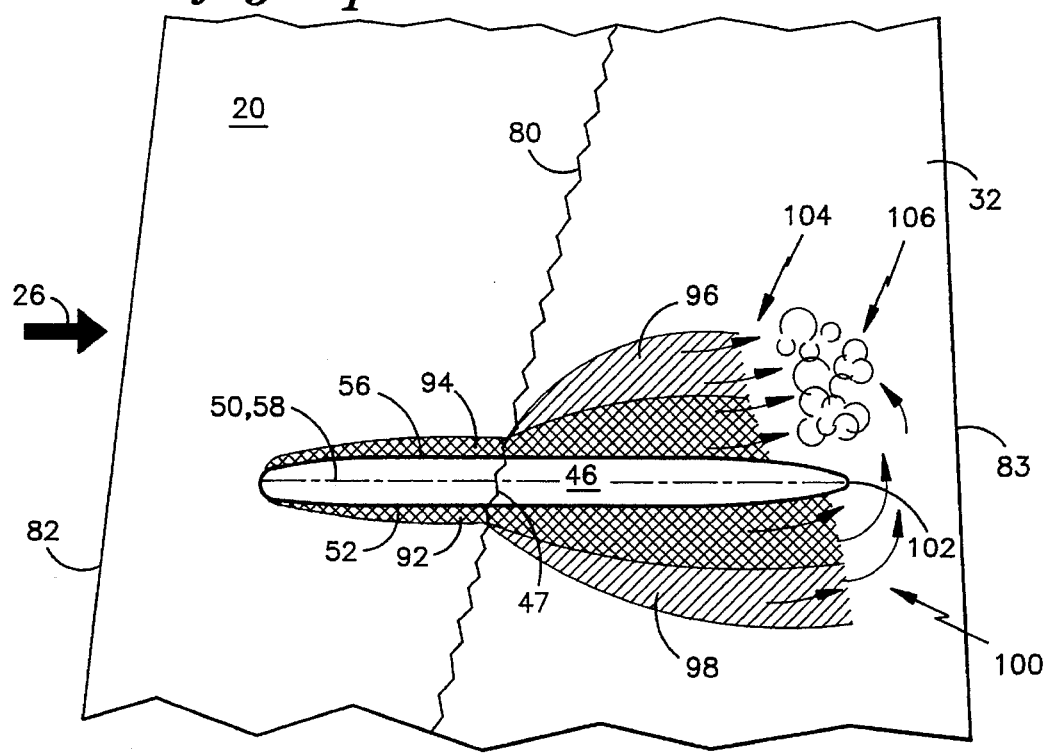
FIG. 3 is a side elevation of a fan blade of the general type shown in FIG. 1 with a conventional suction surface midspan shroud shown in cross section.

An appreciation of the detrimental aerodynamic effects arising from conventional midspan shrouds is gained by reference to FIGS. 2 and 3 which illustrate fan blades 20 rotating in direction 30. Each blade is an airfoil having a leading edge 82, a trailing edge 83, a suction surface 32 and a pressure surface 34. The blade contours influence the static pressure and the velocity of the free stream air flowing through the blade array. Each blade includes an integral midspan shroud set 40 located intermediate the blade root 42 and the blade tip 44 (FIG. 1). Each shroud set is a pair of shrouds—a suction surface shroud 46 projecting circumferentially from the suction surface 32 of each blade, and a pressure surface shroud 48 projecting from the pressure surface 34 of each blade. When all the blades are assembled in an engine, each suction surface shroud abuts the pressure surface shroud of the neighboring blade to form a shroud ring which resists blade vibration and twisting. The shroud ring may be cylindrical or, if the shrouds are inclined relative to the longitudinal central axis, frustoconical. As seen best in FIG. 3 the cross sectional profile of conventional midspan shrouds is uncambered or uncurved. More precisely, the shroud mean camber line 50, which is a line midway between the inner and outer faces 52, 56 of the shroud, is coincident with the shroud chord line 58, which is a straight line joining the ends of the shroud mean camber line.

The air stream 26 flows through the passages 66 between neighboring blades. The are length 72 between corresponding locations on adjacent blades is referred to as the pitch and is a measure of the circumferential spacing between the blades. The air stream 26 flows essentially chordally through the passages, that is, parallel to the blade chord. Downstream of the blades, the air stream is redirected longitudinally by vanes 24 (FIG. 1). As noted above, the blade contours influence the static pressure and the velocity of the free stream air flowing through passages 66. For the purposes of the present invention, it is sufficient to appreciate that, in the absence of a shock wave, the free stream air flowing over the suction surface of each blade decreases in pressure and accelerates as it proceeds from the blade leading edge to the chordwise location of maximum blade thickness. From the location of maximum thickness to the blade trailing edge, the air pressure increases and resists the flow of air, causing the air steam to decelerate, and making it susceptible to separation from the suction surface, even in the absence of the other separation inducing effects described hereinafter. Free stream air flowing over the pressure surface of each blade undergoes more modest pressure and velocity changes and consequently is less predisposed to separate.

At some ambient and operating conditions a planar shock wave 80 forms slightly upstream of the leading edge 82 of each fan blade and extends across the adjacent flow passage 66 and crosses the suction surface shroud 46 of the neighboring blade at a chordwise location 47 on the shroud. The shock wave is a narrow region where the properties of the air stream change abruptly. For example, as air flows from the upstream side of the shock wave to its downstream side, the air pressure increases and its velocity and momentum decrease. Owing to its reduced velocity and momentum, a portion of the free stream air downstream of the shock wave adheres to and becomes part of slower moving individual boundary layers 90, 92, 94 attached to the blade suction surface 32, the shroud inner face 52 and the shroud outer face 56 respectively (the boundary layers are all shown with exaggerated thickness for clarity). Accordingly, individual boundary layers 90, 92, 94 are quite thick downstream of the shock wave. The boundary layer 88 attached to the pressure surface of each blade is not similarly thickened because the shock wave is slightly spaced from the blade leading edge and there is no nearby boundary layer to which the decelerated free stream airflow can adhere. The thickening of the boundary layers is especially noteworthy at the juncture between each blade and its shrouds since the individual blade and shroud boundary layers combine to form disproportionately thick merged boundary layers 96, 98 whose thickness, measured perpendicular to the shroud or blade surface, is as much as 15% of the blade pitch.

The airflow in the blade and shroud a boundary layers is also centrifuged radially outward by the blade rotation. Consequently, the airflow 100 which proceeds downstream of the merged boundary layer 98 (formed by boundary layers 90, 92 at the juncture of the blade and the shroud inner face) and flows past the shroud trailing edge 102 has a significant velocity component in the radial direction. The airflow 100 spills outward around the shroud trailing edge where the aforementioned free stream pressure distribution created by the blade contour encourages at least some of the spilled airflow to turn upstream along the shroud outer face. The spilled airflow collides with the airflow 104 in the merged boundary layer 96, formed by boundary layers 90, 94 at the juncture of the blade and the shroud outer face, and encourages separation of the airflow 104 from the shroud outer face and from the adjoining blade surface. The separation originates at the corner between the blade suction surface (where, as previously mentioned, the airflow is susceptible to separation) and the shroud and rapidly propagates away from the corner and affects the entire merged boundary layer, creating a region 106 of significant turbulence and causing substantial aerodynamic drag. If the turbulent region were small, its presence might be tolerable. However the substantial thickness of the merged boundary layer 96 gives rise to a turbulent region of considerable volume and hence, considerable drag. Similar spillage occurs around the trailing edge of the pressure surface shroud. However as noted above, the contour of the blade pressure surface, in contrast to that of the suction surface, creates a pressure and velocity distribution that is less likely to encourage separation of the air from the blade pressure surface and the shroud extending therefrom.

Figure 4:
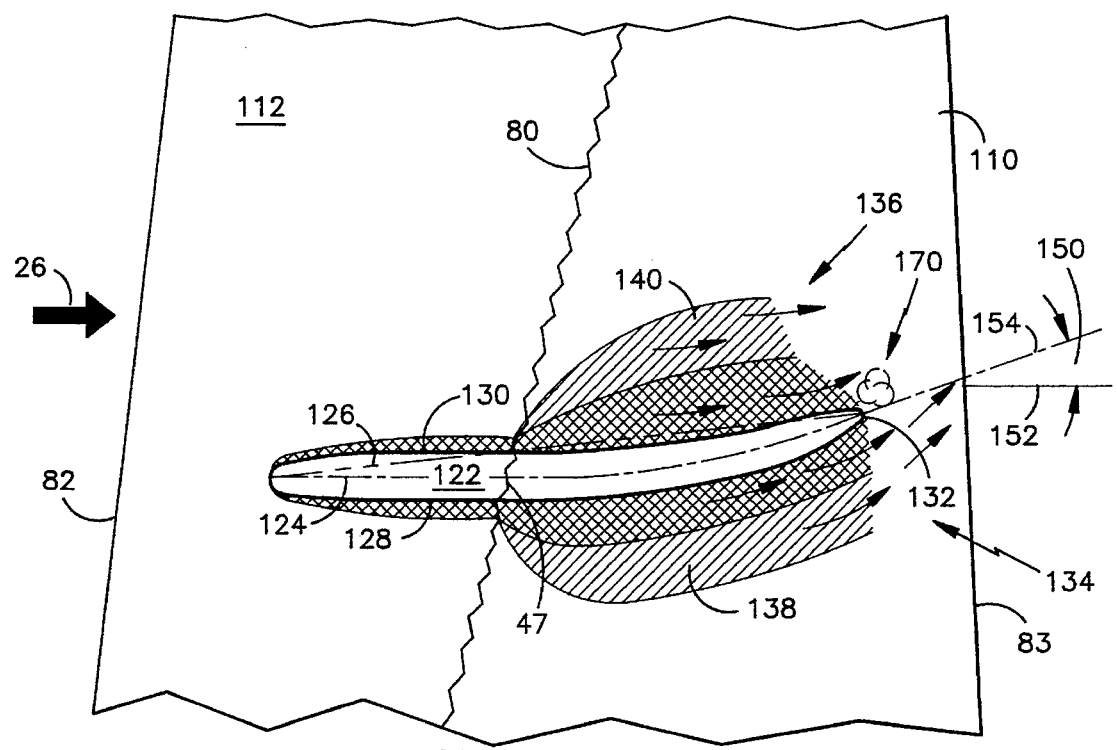
FIG. 4 is a side elevation of the fan blade of FIG. 1 with a suction surface midspan shroud according to the present invention shown in cross section.

FIG. 4 illustrates the suction surface 110 of a fan blade 112 having a leading edge 82, a trailing edge 83 and a shroud 122 of the present invention. According to the invention, the suction surface shroud 122 is cambered or curved toward the blade tip over a portion of its chord. The mean camber line 124 deviates from the chord line 126 (the curvature as illustrated is highly exaggerated for clarity), so that the inner face 128 is partially convex and the outer face 130 is partially concave. The shroud is cambered so that its trailing edge 132 is substantially aligned with the direction of the airflow 134, 136 which proceeds downstream of the merged boundary layers 138, 140 and flows past the shroud trailing edge. This airflow direction is the direction resulting from the combined influences of impeded forward velocity and radial centrifuging of the air flowing in the merged boundary layers 138, 140.

The amount of camber is quantified by a camber angle 150 between a line 152 parallel to the engine longitudinal axis, and a line 154 tangent to the mean camber line at the shroud trailing edge. The camber angle 150 must clearly be greater than zero degrees. However, a camber angle which is too large causes airflow separation near the trailing edge of the shroud inner face, and negates the benefits of camber. Applicants' analysis has suggested that for the particular engine and operating conditions where the first use of this invention is envisioned, a camber angle of ten degrees is too large. For applicants' initial application of the invention, an angle 150 of five degrees was selected as optimum.

The cambered portion originates at approximately the chordwise location 47 where shock wave 80 crosses the shroud and terminates at the shroud trailing edge 132. This origin is chosen since it coincides with the upstream end of the merged boundary layer 140 on the outer face 130 of the suction surface shroud and hence marks the upstream end of the region having a high susceptibility to airflow separation and turbulence. For applicants' initial application of this invention, the location of the shock wave, and hence the origin of the cambered portion is at approximately the midchord of the shroud.

Because the separation of the merged boundary layer originates at the corner where the blade meets the shroud, shroud camber at any appreciable distance away from the blade is ineffective for preventing the onset of separation. Moreover, if the camber of the suction surface shroud is extended circumferentially to its abutment with the adjacent pressure surface shroud, the pressure surface shroud would have to be similarly cambered. However cambering the pressure surface shroud is inadvisable, since the camber increases the risk of separation from the pressure surface shroud while providing no aerodynamic benefit thereto. Therefore the pressure surface shroud is uncambered (that is, its mean camber line and chord line are coincident just as the mean camber line and chord lines 50, 58 of the prior art shroud of FIG. 3 are coincident) and the cambered portion of the suction surface shroud gradually transitions to an uncambered profile at a convenient location circumferentially intermediate the suction surface of the blade and the pressure surface shroud of the neighboring blade. In the preferred embodiment, the shroud transitions continuously from its cambered profile at the blade suction surface to an uncambered profile at approximately twenty percent of the blade pitch 72.

The gradual transition of the suction surface shroud to an uncambered profile is seen in FIGS. 4, 5, and 6 which show cross sections of the suction surface shroud at approximately 0%, 10% and 20% of the blade pitch. The shroud curvature due to camber is exaggerated for clarity. FIG. 4 shows a camber angle 150 of approximately 520 at 0% pitch while FIGS. 5 and 6 show camber angles 150a, 150b of approximately 2.5° and 0° at 10% and 20% pitch respectively. The approximate location of 20% pitch is illustrated by the broken line 103 in FIG. 4. While the illustrated transition is linear, a nonlinear transition may also be acceptable.

In operation, the airflow over the cambered shroud is subject to the same viscous and centrifugal influences as is the flow over a conventional uncambered shroud. The cambered portion of the shroud, however, is aligned with the airflow direction resulting from the combined influences of impeded forward velocity and radial centrifuging of the air flowing in the merged boundary layers. With such alignment, the airflows 134, 136 proceed smoothly off the shroud trailing edge, and the cambered portion also partially blocks the airflow 134 from turning upstream and colliding with the airflow 136. Accordingly, the region of turbulence 170 and the aerodynamic drag associated therewith are quite small.

Although the shroud of the present invention was described in the context of a gas turbine fan blade, it is equally applicable to compressor blades which are formed with midspan shrouds. Accordingly the term "fan blade", as used in the appended claims, also refers to compressor blades.

We claim:

1. A shrouded fan blade for a turbine engine having an array of such blades disposed in an essentially longitudinally flowing fluid stream, said blade having a leading edge, a trailing edge, a pressure surface midspan shroud and a suction surface midspan shroud and said blade also having a shock associated therewith at some ambient and operating conditions, said shock crossing the suction surface midspan shroud of the neighboring blade in said array to define a chordwise location along said suction surface shroud where said fluid stream is highly susceptible to airflow separation, said blade and suction surface shroud also having merged boundary layers associated therewith, the portion of the fluid stream proceeding downstream of said merged boundary layers having a flow direction with a velocity component in the radially outward direction, said blade characterized in that said suction surface shroud has a cambered portion and the trailing edge of said cambered portion is substantially aligned with said flow direction.

2. The fan blade of claim 1 characterized in that said cambered portion originates at approximately the chordwise location where said shock wave crosses said suction surface shroud and terminates at the trailing edge of said shroud.

3. The fan blade of claim 1 characterized in that said cambered portion originates at approximately said chordwise location where said fluid stream along the outer face of said suction surface shroud becomes susceptible to separation and terminates at the trailing edge of said suction surface shroud.

4. The fan blade of claim 1 characterized in that said cambered portion originates at approximately the midchord of said suction surface shroud and terminates at the trailing edge of said suction surface shroud.

5. The fan blade of claim 1 characterized by a camber angle greater than zero degrees and less than an angle at which airflow separates from the inner face of said suction surface shroud.

6. The fan blade of claim 1 characterized by a camber angle greater than zero degrees and less than ten degrees.

7. The fan blade of claim 1 characterized by a camber angle of approximately five degrees.

8. The fan blade of claim 1 characterized in that said suction surface shroud transitions from a cambered profile at the suction surface of said blade to an uncambered profile at a location circumferentially intermediate the suction surface of said blade and the pressure surface shroud of the neighboring blade.

9. The fan blade of claim 1 characterized in that said suction surface shroud transactions from a cambered profile at the suction surface of said blade to an uncambered profile at a location equal to approximately twenty percent of blade pitch.

10. A shrouded fan blade for a turbine engine having an array of such blades disposed in an essentially axially flowing fluid stream, said blade having a leading edge a trailing edge, a pressure surface midspan shroud and a suction surface midspan shroud and said blade also having a shock associated therewith at some ambient and operating conditions, said shock crossing the suction surface midspan shroud of the neighboring blade in said array, said blade and suction surface shroud also having merged boundary layers associated therewith, the portion of the fluid stream proceeding downstream of said merged boundary layers having a flow direction with a velocity component in the radially outward direction, said blade characterized in that said suction surface shroud has a cambered portion having a camber angle of approximately five degrees so that the trailing edge of said cambered portion is substantially aligned with said flow direction, and said cambered portion originates at approximately the midchord of said suction surface shroud and terminates at the trailing edge of said suction surface shroud, and said suction surface shroud continuously transitions from a cambered profile at the suction surface of said blade to an uncambered profile at approximately twenty percent of blade pitch.

* * * * *